(12) United States Patent
Cho et al.

(10) Patent No.: US 8,162,674 B2
(45) Date of Patent: Apr. 24, 2012

(54) BACKLIGHT ASSEMBLY AND DISPLAY DEVICE HAVING THE SAME

(75) Inventors: Joo-Woan Cho, Asan-si (KR); Seong-Sik Choi, Seoul (KR); Yong-Woo Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/618,937

(22) Filed: Nov. 16, 2009

(65) Prior Publication Data

US 2010/0188840 A1   Jul. 29, 2010

(30) Foreign Application Priority Data

Jan. 23, 2009   (KR) .................. 10-2009-0006329

(51) Int. Cl.
*H01R 12/00* (2006.01)

(52) U.S. Cl. .................. 439/74; 439/857; 362/613

(58) Field of Classification Search .............. 439/56, 439/74, 76.1, 857, 953; 362/600, 612, 613, 362/800
See application file for complete search history.

(56) References Cited

U.S. PATENT DOCUMENTS

| | | | | |
|---|---|---|---|---|
| 3,553,870 A | * | 1/1971 | Rudolph | 40/576 |
| 5,233,502 A | * | 8/1993 | Beatty et al. | 361/679.09 |
| 5,537,300 A | * | 7/1996 | Kraines et al. | 362/86 |
| 6,422,716 B2 | * | 7/2002 | Henrici et al. | 362/235 |
| 2009/0244886 A1 | * | 10/2009 | Cho et al. | 362/97.1 |

* cited by examiner

*Primary Examiner* — Khiem Nguyen
(74) *Attorney, Agent, or Firm* — Cantor Colburn LLP

(57) ABSTRACT

A backlight assembly includes a first substrate, a first electrode disposed on the first substrate, a second substrate disposed opposite to the first substrate, and a connector. The connector is disposed on the second substrate and includes a second electrode connected to the first electrode, and an elastic member which applies a force to the second electrode. The connector increases a contact force between the first electrode and the second electrode by applying the force to the second electrode.

20 Claims, 12 Drawing Sheets

BACKLIGHT ASSEMBLY AND DISPLAY DEVICE HAVING THE SAME

This application claims priority to Korean Patent Application No. 10-2009-0006329, filed on Jan. 23, 2009, and all the benefits accruing therefrom under 35 U.S.C. §119, the contents of which in its entirety are herein incorporated by reference.

BACKGROUND OF THE INVENTION

1. Field of the Invention

The present invention relates to a backlight assembly and a display device having the same, and, more particularly, to a backlight assembly and a display device having the same, in which a first circuit board, having light sources mounted thereon, and a second circuit board, having a power supply part mounted thereon to supply power to the light sources, are freely arranged and easily connected to each other.

2. Description of the Related Art

A liquid crystal display ("LCD"), is a widely used type of flat panel display ("FPD"), and typically includes two substrates, on which electrodes are disposed, and a liquid crystal layer interposed between the two substrates. In a liquid crystal display, liquid crystal molecules in the liquid crystal layer are arranged according to a voltage applied to the electrodes, and a quantity of light passing through the liquid crystal layer is thereby adjusted to display an image.

The liquid crystal display is widely used, due to low power consumption, for example. However, the liquid crystal display has no self-luminous capability, and thus separate light sources for providing the light are required. Accordingly, light sources such as fluorescent lamps or light emitting diodes ("LEDs"), for example, are typically used in the liquid crystal display.

In addition, when light emitting diodes are used as the light sources, for example, a separate circuit board having the light sources thereon is used. More specifically, the light sources are typically arranged at predetermined intervals on the circuit board, and wire patterns for connecting the light sources are disposed on the circuit board, as well. A power supply part is connected to the light sources to supply power to the light sources.

The power supply part is often mounted on a separate, second circuit board, and as a result, a structure for connecting the power supply part to the first circuit board, on which the light sources are mounted, is required. To connect the power supply part to the first circuit board on which the light sources are mounted, the first circuit board and the power supply part, mounted on the second circuit board, are disposed adjacent to each other. Moreover, a reliable connector for connecting the first circuit board to the power supply part on the second circuit board is required. Accordingly, there is a need for a reliable structure in which the power supply unit on the second circuit board and the first circuit board having the light sources mounted thereon can be freely arranged while danger of spark generation in doing so is substantially reduced and/or effectively eliminated.

BRIEF SUMMARY OF THE INVENTION

Accordingly, an exemplary embodiment provides a backlight assembly having a structure, in which a first circuit board, having light sources mounted thereon, and a second circuit board, having a power supply part mounted thereon to supply power to the light sources, can be freely arranged and easily and reliably connected to each other.

Another exemplary embodiment provides a display device including the backlight assembly.

In an exemplary embodiment, a backlight assembly includes a first substrate, a first electrode disposed on the first substrate, a second substrate disposed opposite to the first substrate, and a connector disposed on the second substrate and including a second electrode connected to the first electrode and an elastic member which applies a force to the second electrodes, thereby increasing a contact force between the first electrode and the second electrode.

In an alternative exemplary embodiment, a display device includes a display panel which displays an image, a first substrate disposed on a lower portion of the display panel, a first electrode disposed on the first substrate, a second substrate disposed opposite to the first substrate, a connector disposed on the second substrate and including a second electrode connected to the first electrode and an elastic member which applies a force to the second electrode, thereby increasing a contact force between the first electrode and the second electrode, and a receptacle which receives therein the first substrate, the connector and the second substrate.

BRIEF DESCRIPTION OF THE DRAWINGS

The above and other aspects, features and advantages of the present invention will be more readily apparent by describing in further detail exemplary embodiments thereof with reference to the accompanying drawings, in which.

DETAILED DESCRIPTION OF THE INVENTION

Figure 1:
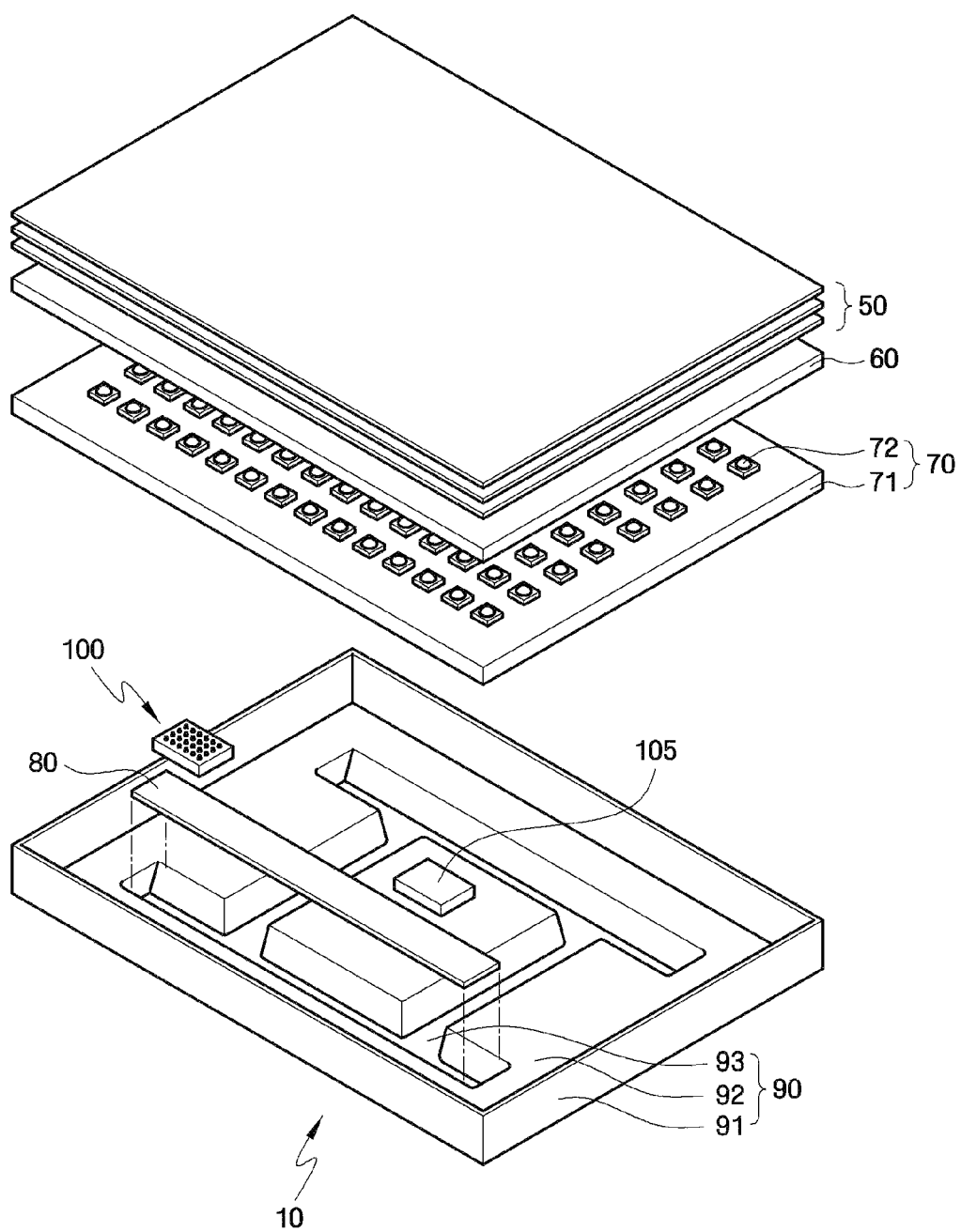
FIG. 1 is an exploded perspective view of an exemplary embodiment of a backlight assembly according to the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Figure 2:
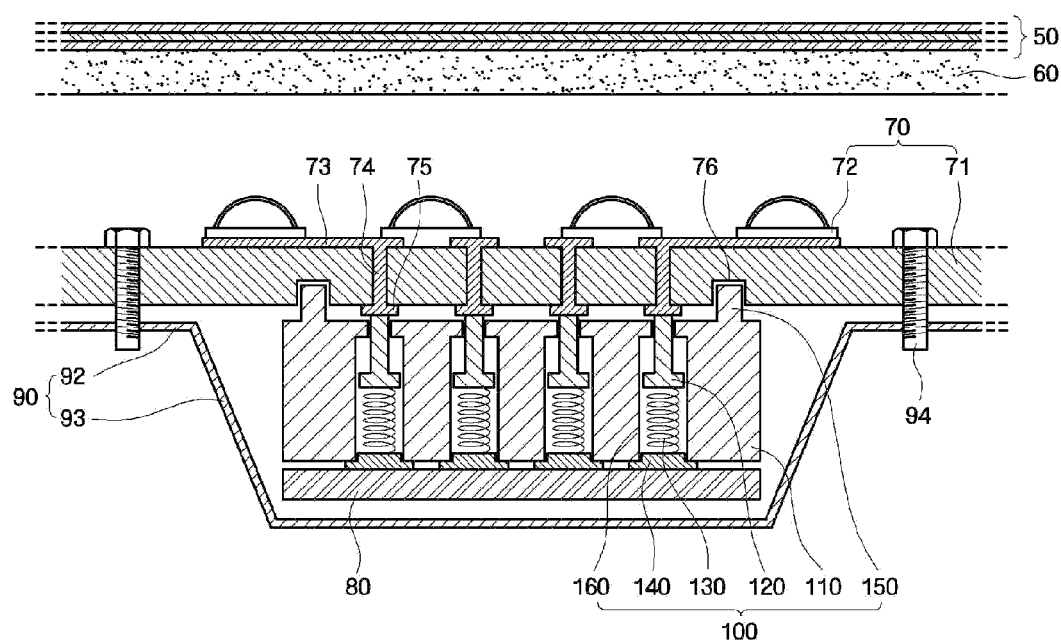
FIG. 2 is a partial cross-sectional view of the backlight assembly shown in FIG. 1.

Hereinafter, a backlight assembly according to an exemplary embodiment will be described in further detail with reference to FIGS. 1 and 2. FIG. 1 is an exploded perspective view of an exemplary embodiment of a backlight assembly according to the present invention, and FIG. 2 is a partial cross-sectional view of the backlight assembly shown in FIG. 1.

A backlight assembly 10 according to an exemplary embodiment includes an optical sheet 50, a diffusion plate 60, a light source assembly 70 and a lower receptacle 90.

The light source assembly 70 is a light emitting device which provides light to a display panel 30 (FIG. 13), and includes one or more light source units 72 and a first substrate 71.

The light source unit 72 emits light in as a point light source, for example. More specifically, the light source unit 72 may be, for example, a point light source such as a light emitting diode ("LED"), but alternative exemplary embodiments are not limited thereto. The light source unit 72 may emit white light. Accordingly, the light source unit 72 may include at least one light emitting chip to emit the white light. The light emitting chip may include one light emitting diode which emits a single color light, or, alternatively, may include red, green, and blue light emitting diodes which emit red light, green light, and blue light, respectively. Since the light emitting diodes emit the red light, green light, and blue light, respectively, a color purity is substantially increased, and a an image quality of a high-quality image is substantially improved and is displayed the display device.

In addition, the red light, the green light and the blue light can be separately controlled, and a color temperature of the light source is therefore more easily adjusted. As a result, the display device according to an exemplary embodiment displays substantially improved color characteristics.

In alternative exemplary embodiments, the light source unit 72 is not limited to the light emitting diode, or to being a point light source. For example, the light source unit 72 according to an alternative exemplary embodiment may be a line light source, such as a fluorescent lamp, for example. More particularly, the line light source may include a fluorescent lamp such as a cold cathode fluorescent lamp ("CCFL"), a hot cathode fluorescent lamp ("HCFL"), and/or an external electrode fluorescent lamp ("EEFL"), for example.

In an exemplary embodiment, the light source units 72 are arranged at predetermined intervals on the first substrate 71. In addition, the light source unit 72 including a light emitting diode has a higher luminance and is smaller-sized as compared to the fluorescent lamp, and thus an exemplary embodiment provides a display device having a substantially improved, e.g., reduced, thickness, such as in an ultra-slim display device.

As shown in FIG. 1, the light source units 72 are arranged on the first substrate 71 uniformly and successively, and thus a luminance uniformity of the backlight assembly 10 according to an exemplary embodiment is substantially improved.

Wire patterns 73 are disposed on the first substrate 71, for supplying power to the light source units 72. More specifically, the wire patterns 73 provide electrical paths which receive the power from a power supply part 105 and provide the power to the light source units 72.

The wire patterns 73 may be disposed on one surface or, alternatively, on two surfaces of the first substrate 71. When the wire patterns 73 are disposed on both, e.g., two, surfaces of the first substrate 71, connection wires (not shown) for connecting the wire patterns 73 formed on both surfaces of the first substrate 71 are provided.

First electrodes 74, to which the power from a power supply part 105 is applied, are connected to the wire patterns 73. The first electrodes 74 connect the first substrate 71 to a second substrate 80 through a connector 100. When the wire patterns 73 are disposed on the upper surface of the first substrate 71, the first electrodes 74 penetrate the first substrate 71, and extend toward the lower part of the first substrate 71, as shown in FIG. 2. In this case, electrode pads 75, which are connected to the first electrodes 74, respectively, and have a cross-sectional area greater than a cross-sectional area of the first electrodes 74, are disposed on the lower surface of the first substrate 71.

The first electrodes 74 may be disposed to project toward the lower surface of the first substrate 71 or, alternatively, to coincide with the lower surface of the first substrate 71. The electrode pads 75 facilitate contact of the first electrodes 74 with second electrodes 120 of the connector 100, and thus a cross-sectional area of the electrode pad 75 is greater than that of the first electrode 74. In an alternative exemplary embodiment, however, the electrode pads 75 may be omitted if the cross-sectional area of the first electrode 74 is wide enough to contact the second electrode 120.

The second substrate 80 according to an exemplary embodiment includes the power supply part 105, and is configured to supply the power to the first substrate 71. The second substrate 80 may be disposed on the lower part of the first substrate 71, and may be smaller than the first substrate 71. The second substrate 80 is connected to the first substrate 71 through the connector 100.

The connector 100 is mounted on the second substrate 80 by surface mount technology ("SMT"), e.g., a technology wherein components are mounted directly onto a surface of printed circuit boards ("PCBs"), and connects the first substrate 71 to the second substrate 80. Thus, the connector 100 according to an exemplary embodiment is easily connected to the first substrate 71 regardless of a position of the second substrate 80. The connector 110 will be described in further detail below.

Figure 13:
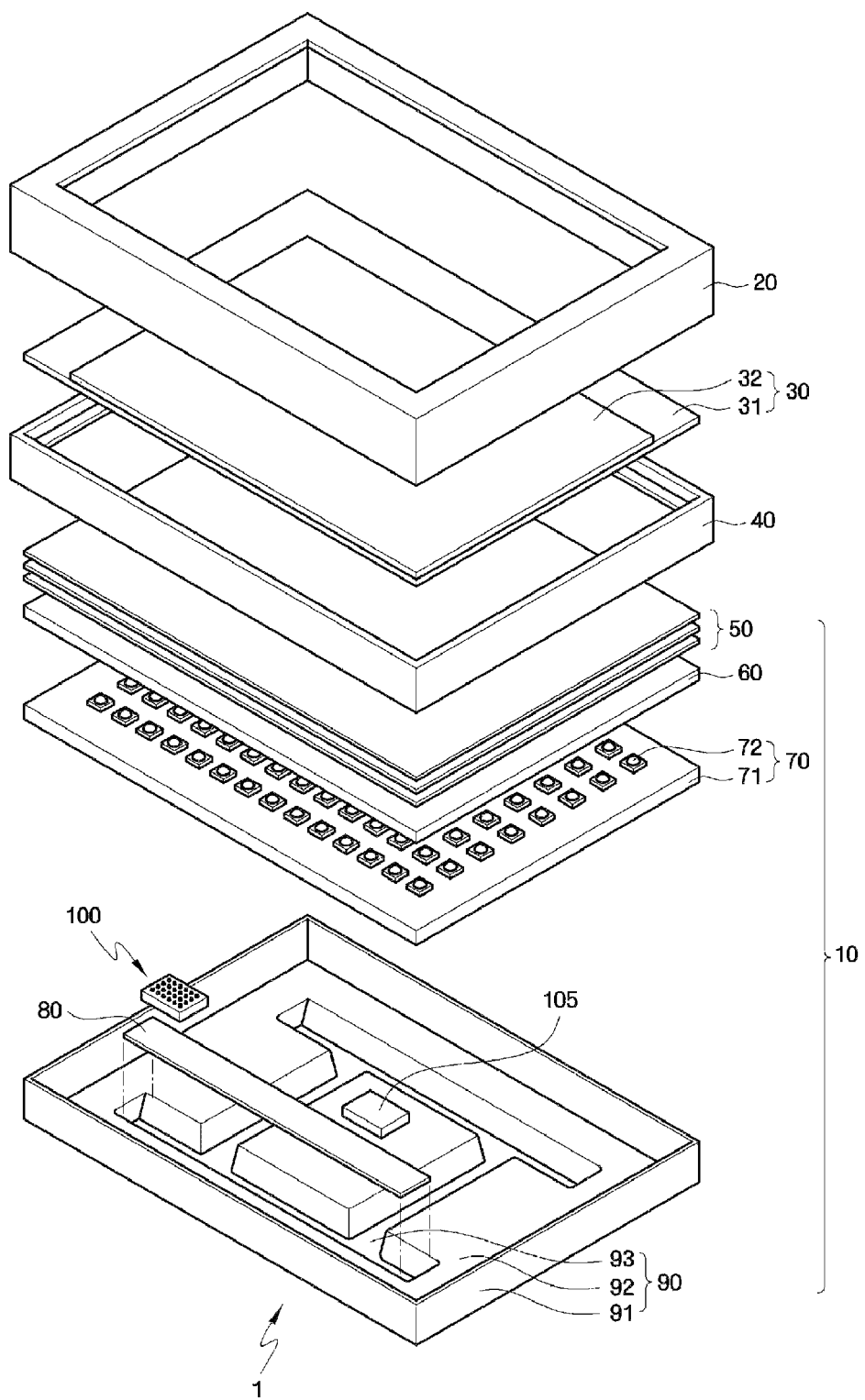
FIG. 13 is an exploded perspective view of an exemplary embodiment of a display device according to the present invention.

The diffusion plate 60 is disposed on the upper part of the light source assembly 70. The diffusion plate 60 diffuses light provided from the light source assembly 70 in different directions, and thereby substantially reduces a bright defect, which appears as a bright part corresponding to a shape of the light source unit 72, not seen on a front surface of the display panel 30 (FIG. 13).

To provide uniform luminance, the diffusion plate 60 may include a diffusion material mixed with a transparent resin plate. The transparent resin plate, for example, may be made of acryl or polycarbonate, and the diffusion material may be particles of cross-linked polymethylmethacrylate, cross-linked polystyrene, cross-linked sodium polyacrylate, cross-linked silicon, cross-linked acryl-styrene copolymer, calcium carbonate or barium sulfate, but alternative exemplary embodiments are not limited thereto.

The optical sheet 50 is disposed on an upper part of the diffusion plate 60, and diffuses and condenses light transferred from the diffusion plate 60. In an exemplary embodiment, the optical sheet 50 includes a first prism sheet, a second prism sheet and a protection sheet, for example.

The first prism sheet and the second prism sheet improve a brightness of the display device in a range of an effective viewing angle by concentrating light incident at a small angle upon the front side through refraction of light having passed through the diffusion plate 60.

The protection sheet disposed on the first prism sheet and the second prism sheet protects surfaces of the first prism sheet and the second prism sheet, and also diffuses the light to make a distribution of the light substantially uniform.

In an exemplary embodiment, the optical sheet 50 may include one or more of a diffusion sheet, a prism sheet and a protection sheet, and may therefore have a composite function related to the abovementioned components. Specifically, a lower part of the optical sheet 50 may be disposed to have a diffusion function, while an upper part thereof may have a prism pattern disposed thereon, and a protection layer may be disposed on the prism pattern. Since the optical sheet 50 has multiple functions, including the diffusion function and the prism function, a required number of components of the display device according to an exemplary embodiment is substantially reduced, thereby providing a display device having a substantially reduced profile and/or thickness.

The optical sheet 50, the diffusion plate 60, and the light source assembly 70 are received in, e.g., are disposed in, the lower receptacle 90. The lower receptacle 90 includes four side-wall parts 91 substantially surrounding side surfaces of the optical sheet 50, the diffusion plate 60, and the light source assembly 70, and a bottom part 92 extending from the lower parts of the four side-wall parts 91.

In an exemplary embodiment, an embayment part 93 is disposed in the bottom part 92 of the lower receptacle 90 to provide a space for accommodating the second substrate 80, as shown in FIG. 2. The lower receptacle 90 may be formed by bending a metal plate, for example, and the second substrate 80 formed in the bottom part 92 to have a structure which reinforces a stiffness of the lower receptacle 90.

The embayment part 93 according to an exemplary embodiment has a depth and a size sufficient to accommodate the second substrate 80 and the connector 100 therein.

In an exemplary embodiment, the first substrate 71 may be engaged with, e.g., connected to, the lower receptacle 90 by fixing members 94. The fixing members 94 may be screws or bolts, for example, and may be disposed on the bottom part substantially adjacent to, e.g., proximate to, the embayment part 93. The fixing members 94 may be disposed on two sides of the embayment part 93.

Figure 3:
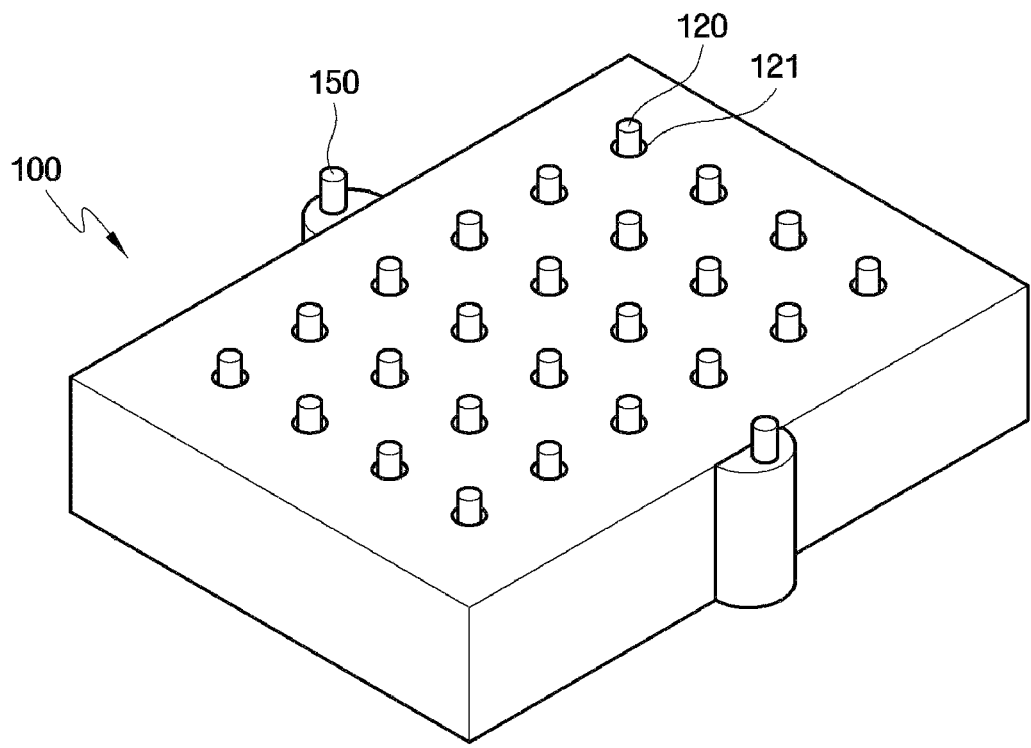
FIG. 3 is a perspective view of an exemplary embodiment of a connector included in the backlight assembly shown in FIG. 1.
Figure 4:
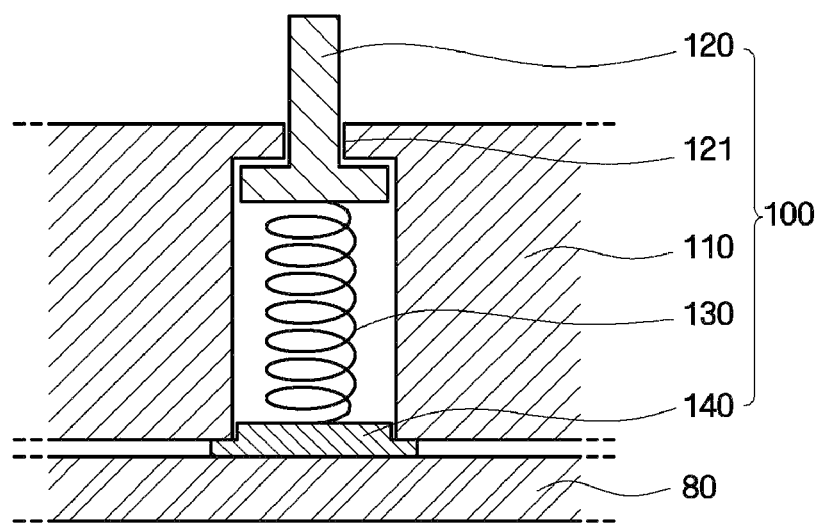
FIG. 4 is a partial cross-sectional view of the connector shown in FIG. 3.

Hereinafter, the connector 100 according to an exemplary embodiment will be described in further detail with reference to FIGS. 2 to 4. FIG. 3 is a perspective view of an exemplary embodiment of a connector included in the backlight assembly shown in FIG. 1, and FIG. 4 is a partial cross-sectional view of the connector shown in FIG. 3.

The connector 100 connects the first substrate 71 to the second substrate 80. The connector 100 may be disposed on either of the first substrate 71 and the second substrate 80. The connector 100 connects a plurality of wires between the first substrate 71 and the second substrate 80.

The connector 100 according to an exemplary embodiment includes a body part 110, cylinders 160, second electrodes 120, elastic members 130, connection electrodes 140 and fixing projections 150. The body part 110 includes an insulating material, and further includes a plurality of the cylinders 160 disposed therein. The cylinders 160 may be disposed in a substantially matrix pattern on the body part 110. The second electrodes 120 are inserted into corresponding cylinders 160.

The second electrodes 120 contact the first electrodes 74 of the first substrate 71 to apply a voltage thereto, and the second electrodes 120 disposed in the connector 100 apply the voltage to corresponding light source units 72. In an exemplary embodiment, the second electrodes 120 are arranged in a substantially matrix pattern on the connector 100, and are therefore disposed in a narrow space.

A hole 121 is formed in the connector on one side of each of the cylinders 160. More specifically, the hole 121 is formed between the cylinder 160 and the first electrode 74 on the body part 110, and a first end part of the second electrode 120 penetrates, e.g., is disposed in, the hole 121, as shown in FIG. 3. In an exemplary embodiment, a diameter of the hole 121 is less than a diameter of the cylinder 160.

As best shown in FIGS. 2 and 4, the second electrode 120 has the first end part (e.g., the upper end of the second electrode 120, as viewed in FIG. 4) having the diameter less than the diameter of the hole 121 to penetrate the hole 121, and a second end part (e.g., the lower end part as viewed in FIG. 4) having a diameter greater than the diameter of the hole 121 disposed inside the cylinder 160. Put another way, a cross section of the second electrode 120 according to an exemplary embodiment may be in the shape of an inverted "T" (as shown in FIG. 4).

The second end part of the second electrode 120 is disposed in contact with the elastic member 130. The elastic member 130 provides a force, such as an elastic force, to the second electrode 120 to substantially increase a contact force between the first electrode 74 and the second electrode 120.

In an exemplary embodiment, the elastic member 130 includes a conductive elastic body, and thus applies a voltage to the second electrode 120, as well as providing the elastic force thereto. Specifically, the elastic member 130 may be a metal spring, for example. However, the elastic member 130 is not limited to a metal spring, and may include an elastic body, such as rubber containing a conductive material, but alternative exemplary embodiments are not limited thereto.

The elastic member 130 is substantially inside the cylinder 160, and has one side contacting the second electrode 120 and another side contacting the connection electrode 140. The connection electrode 140 blocks one side of the cylinder 160 to prevent the elastic member 130 from seceding from, e.g., withdrawing from or out of, the cylinder 160 to outside the cylinder 160, and connects the elastic member 130 to an external wire (not shown).

The connection electrode 140 may be disposed on the wire pattern (not shown) disposed on the second substrate 80 by the surface mount technology described in greater detail above.

In an exemplary embodiment, the first end part of the second electrode 120 may project through the hole 121 of the connector 100. Thus, second end part of the second electrode is disposed inside the cylinder 160 so that the elastic force of the elastic member 130 is transferred thereto, and thus the first end part of the second electrode 120 projects outside through the hole 121.

The connector 100 according to an exemplary embodiment may include fixing projections 150 projecting from the body part 110 to an upper part thereof, as shown in FIG. 2. The fixing projections 150 fix the connector 100 to the first substrate 71, and may be inserted into fixing holes 76 formed in a lower surface of the first substrate 71. At least one fixing projection 150 may be disposed on one side of the connector 100, and the number of fixing projections may be adjusted in accordance with a size of the connector 100 and/or the elastic force of the elastic member 130 included in the connector 100 according to exemplary embodiments.

Figure 5A:
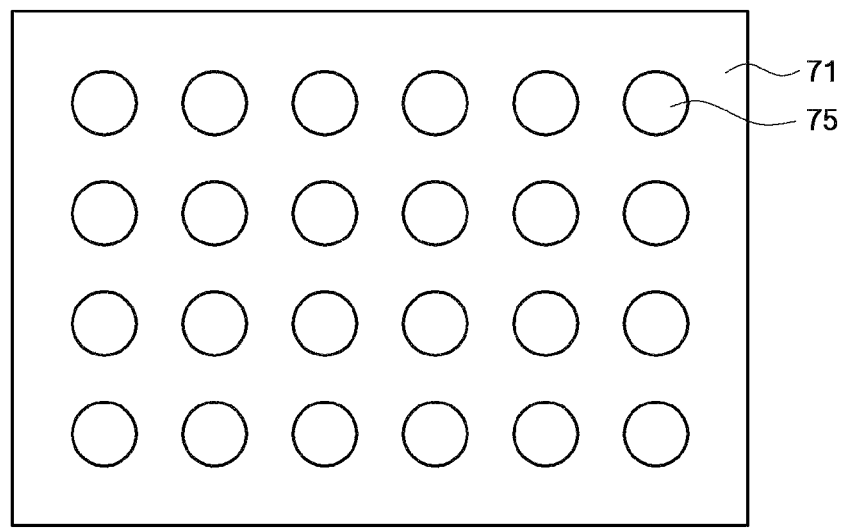
FIG. 5A is a partial bottom view of an exemplary embodiment of a first substrate included in the backlight assembly shown in FIG. 1.
Figure 5B:
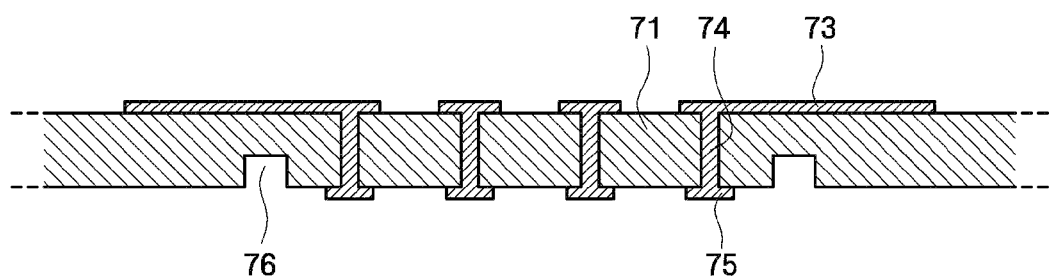
FIG. 5B is a partial cross-sectional view of the first substrate shown in FIG. 5B.

Hereinafter, the first substrate 71 according to an exemplary embodiment will be described in further detail with reference to FIGS. 2, 5A and 5B. FIG. 5A is a partial bottom perspective view of an exemplary embodiment of a first substrate included in the backlight assembly shown FIG. 1, and FIG. 5B is a partial cross-sectional view of the first substrate shown in FIG. 1.

FIG. 5A illustrates a part of the first substrate 71 on which the electrode pads 75 are disposed. The electrode pads 75 may be disposed in a disposed matrix pattern on the bottom surface of the first substrate 71. As described in greater detail above, the electrode pads 75 may be substantially in substantially the same form as the second electrodes 120 to be in one-to-one contact with the second electrodes 120.

In an exemplary embodiment, the wire patterns 73, the first electrodes 74, and the electrode pads 75 may be separately disposed to be electrically connected together, or, alternatively, may be formed in a single body. For example, in the case where the wire pattern 73 is formed on the lower surface of the first substrate 71, a part of the wire pattern 73 may be extended to form the electrode pad 75. Also, a part of the first electrode 74, which is exposed to the lower surface of the first substrate 71, may be the electrode pad 75.

Figure 6A:
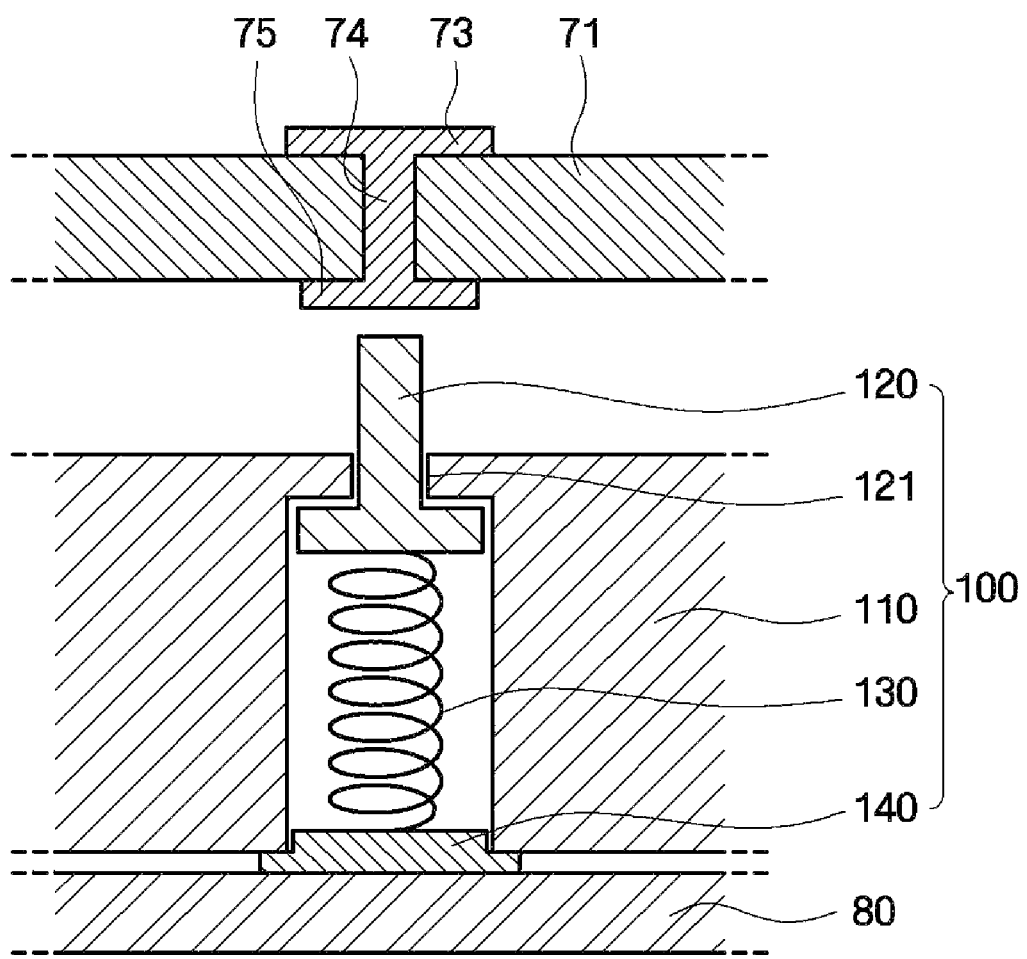
FIGS. 6A and 6B are partial cross-sectional views illustrating a method of engaging an exemplary embodiment of a first substrate with an exemplary embodiment of a second substrate of the backlight assembly shown in FIG. 1.
Figure 6B:
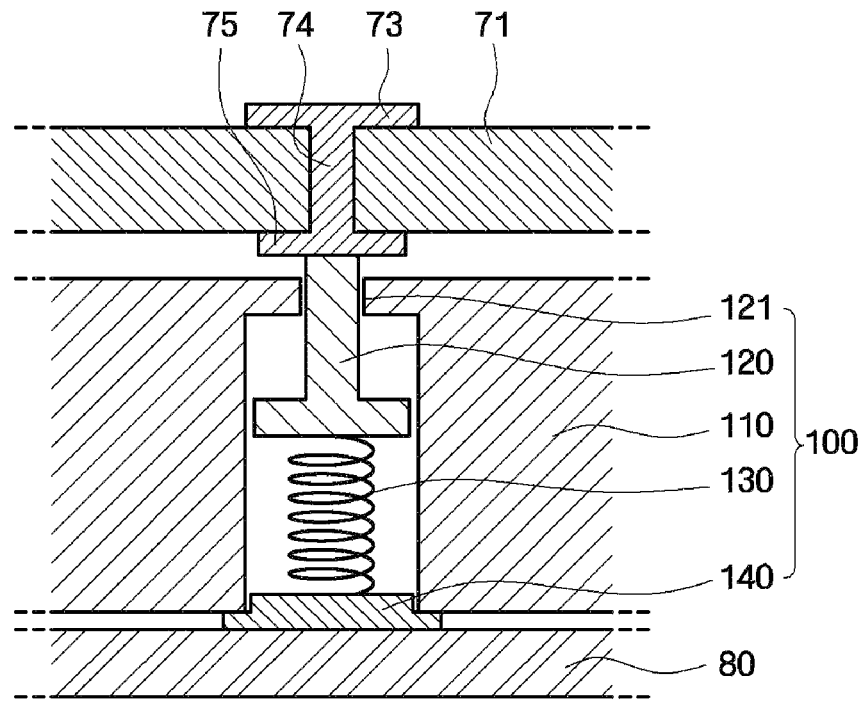

Hereinafter, a method of engaging the first substrate 71 with the second substrate 80 will be described in further detail with reference to FIGS. 6A and 6B. FIGS. 6A and 6B are partial cross-sectional views illustrating a method of engaging the first substrate 71 with the second substrate 80 of the backlight assembly shown in FIG. 1.

Referring to FIG. 6A, the connector 100 according to an exemplary embodiment is mounted on, e.g., is disposed on, the second substrate 80, and the second substrate 80 is not yet electrically connected to the first substrate 71. Thus, the second electrode 120 is disposed apart from, e.g., separate from, the first electrode 74, and the elastic member 130 extends to push the second electrode 120 upward.

Referring to FIG. 6B, the gap between the first substrate 71 and the second substrate 80 is reduced, and the first electrode 74 and the second electrode 120 are thereby in contact with each other. Thus, the second electrode 120 is pushed down by the first electrode 74. Accordingly, the elastic member 130 is compressed.

The contact force of the first electrode 74 and the second electrode 120 is substantially improved by the elastic force of the elastic member 130. Thus, the elastic member 130 ensures that the first electrode 74 and the second electrode 120 are always in contact with each other by continuously applying pressure, e.g., the force, to the second electrode 120. For example, when the gap between the first substrate 71 and the second substrate 80 is widened, the second electrode 120 further projects toward the first electrode 74 to maintain the contact between first electrode 74 and the second electrode 120.

If the contact between the first electrode 74 and the second electrode 120 becomes unstable, a spark may be generated between the first electrode 74 and the second electrode 120. If a spark is generated between the first electrode 74 and the second electrode 120, the first electrode 74 or the second electrode 120 are damaged, and thus power is be applied thereto.

More specifically, in a case in which the light source unit 72 requires a high-voltage power, the first electrode 74 and/or the second electrode 120 may be severely damaged by the spark. Thus, by maintaining contact between the first electrode 74 and/or the second electrode 120, an exemplary embodiment effectively prevents formation of the spark, thereby substantially reducing damage to the first electrode 74 and/or the second electrode 120.

Figure 7:
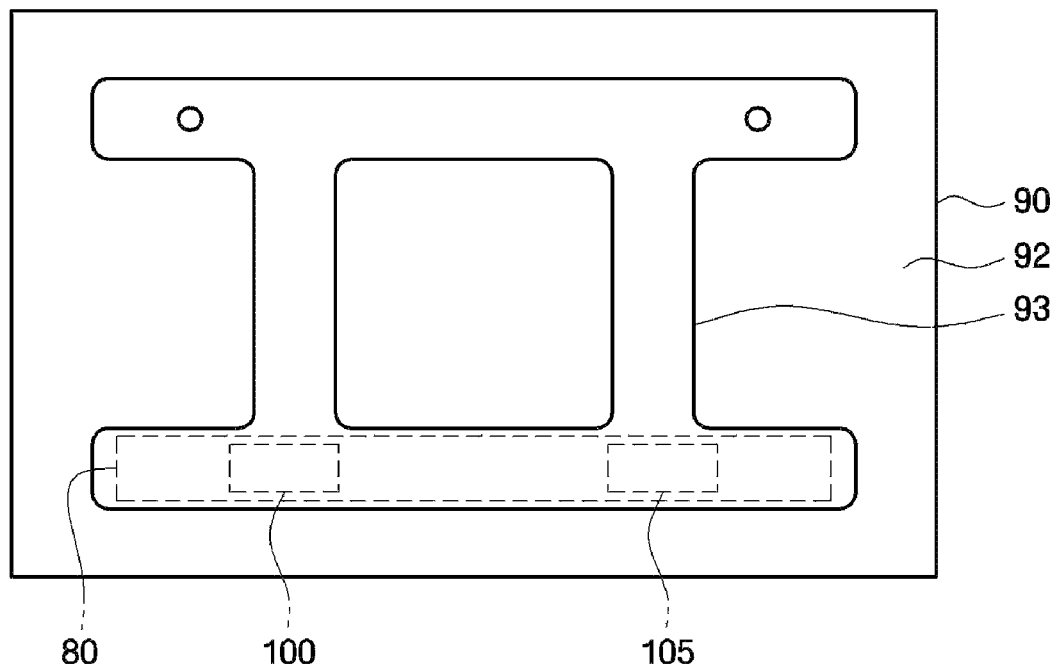
FIG. 7 is a bottom perspective view of the backlight assembly shown in FIG. 1.

Hereinafter, an exemplary embodiment of an arrangement of the second substrate 80 and the connector 100 will be described in further detail with reference to FIGS. 2 to 7. FIG. 7 is a bottom perspective view of the backlight assembly shown in FIG. 1.

The bottom part 92 of the lower receptacle 90 includes the embayment part 93 projecting outside. In an exemplary embodiment, the embayment part 93 is defined by the inner side of the lower receptacle 90, and is formed to be embayed from, e.g., projects downward from the bottom part 92 of the inner side of the lower receptacle 90 to the lower part to accommodate, e.g., embay, components such as the second substrate 80 and the connector 100 therein. Accordingly, as shown in FIG. 7, the embayment part 93 projects toward an outside portion of the lower receptacle 90.

As described above, the embayment part 93 provides a space for accommodating the second substrate 80 and the connector 100, and also maintains the stiffness of the lower receptacle 90. Specifically, the bottom part 92 of the lower receptacle 90 may be formed of a flat metal plate material, and, in order for the bottom part 92 of the metal plate material to maintain the stiffness against an external force, a structure in which a part of the bottom part 92 is embayed or projects is required. As described above, the embayment part 93 formed by projecting the bottom part 92 to the outside may be in various forms in alternative exemplary embodiments. For example, as illustrated in FIG. 7, the embayment part 93 according to an exemplary embodiment may be "II"-shaped, e.g., may have a shape which is defined by two rectangles having equal first lengths and disposed apart from each other and longitudinally aligned parallel to each other along a first direction, intersected by two additional rectangles having equal second lengths, shorter than the first lengths, and disposed apart from each other and longitudinally aligned parallel to each other along a second direction substantially perpendicular to the first direction. Put another way, the embayment part 93 may be shaped substantially like the Roman numeral corresponding to Arabic numeral "2" (e.g., "II"), as shown in FIG. 7.

In an exemplary embodiment, the embayment part 93 supports fixing the lower receptacle 90 to an external component (not shown). For example, when the display device according to an exemplary embodiment is a wall-mount type display device, a part of the embayment part 93 may be engaged with a wall mount bracket (not shown). Accordingly, the embayment part 93 may be disposed at several positions of the lower receptacle 90 as needed, and the second substrate 80 and the connector 100 may be disposed inside the embayment part 93. However, the second substrate 80 and the connector 100 are not limited to the foregoing examples in alternative exemplary embodiments.

The second substrate 80 and the connector 100 may be substantially in any position in which they at least partially overlap the first substrate 71. Accordingly, the second substrate 80 and the connector are freely arranged, since diverse components can be mounted on the bottom part 92 of the lower receptacle 90, and the lower receptacle 90 according to an exemplary embodiment can be freely designed.

Figure 8:
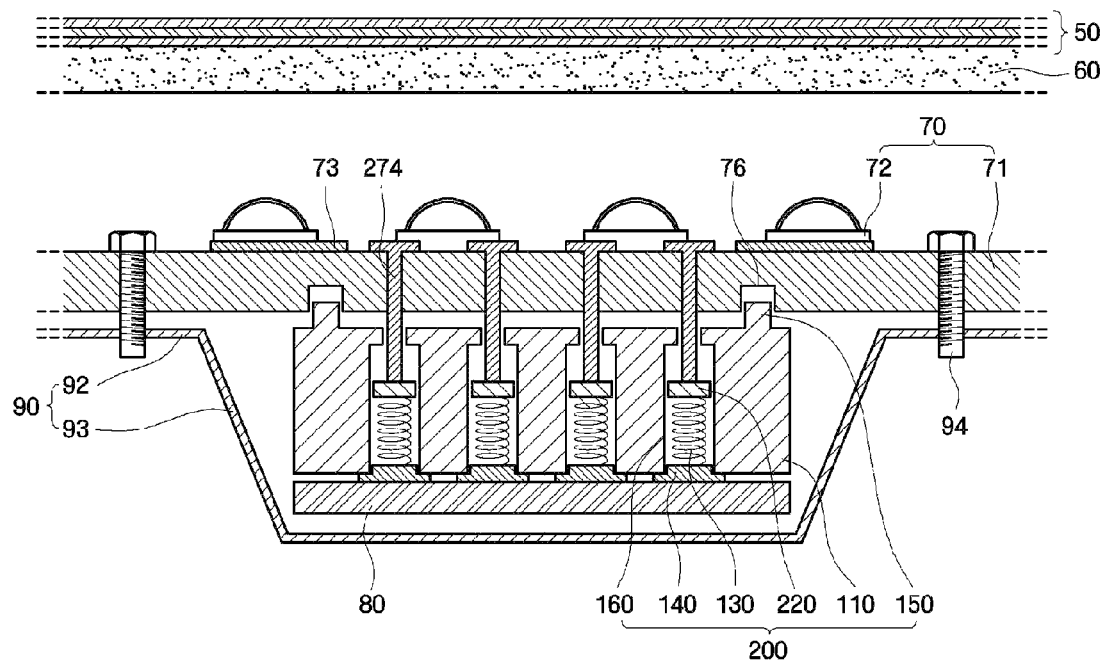
FIG. 8 is a partial cross-sectional view of an alternative exemplary embodiment of a backlight assembly according to the present invention.
Figure 9:
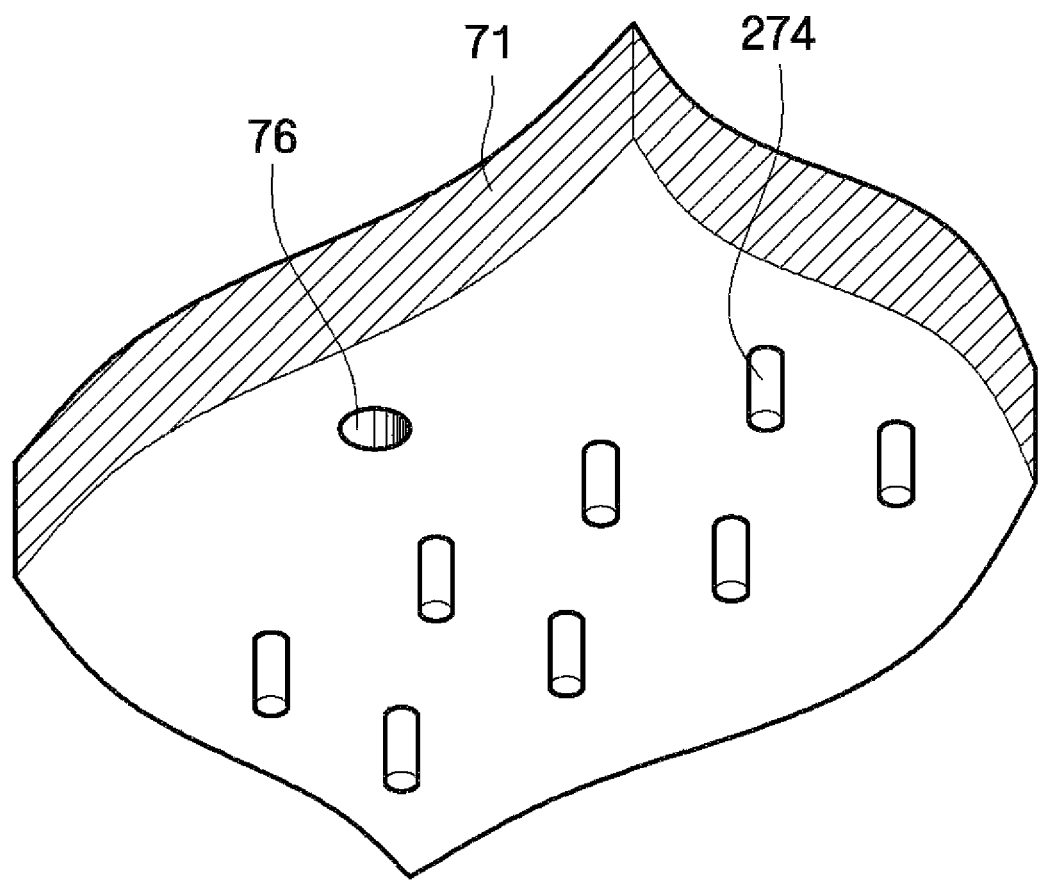
FIG. 9 is a partial perspective view of an exemplary embodiment of a first substrate included in the backlight assembly shown in FIG. 8.
Figure 10A:
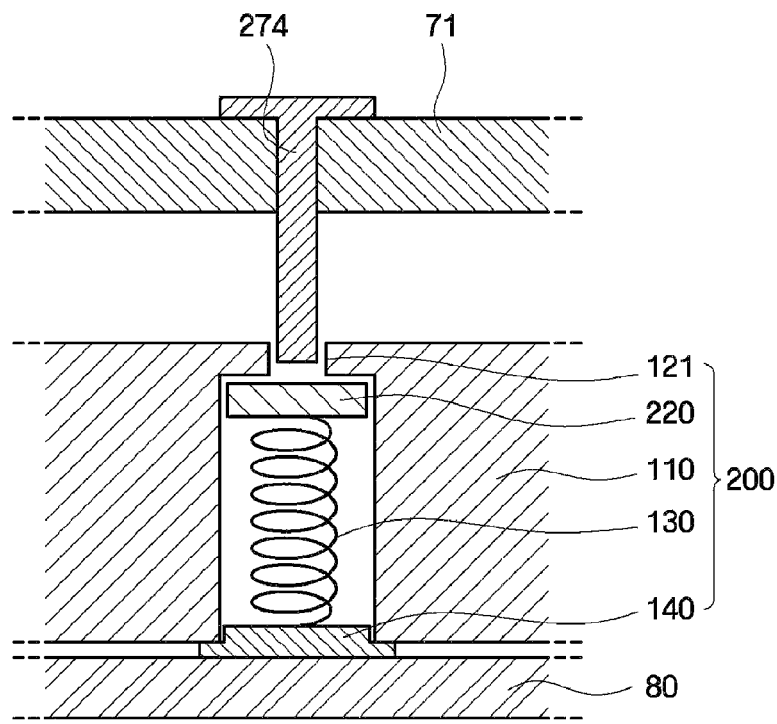
FIGS. 10A and 10B are partial cross-sectional views illustrating a method of engaging an exemplary embodiment of a first substrate with an exemplary embodiment of a second substrate of the backlight assembly shown in FIG. 8.
Figure 10B:
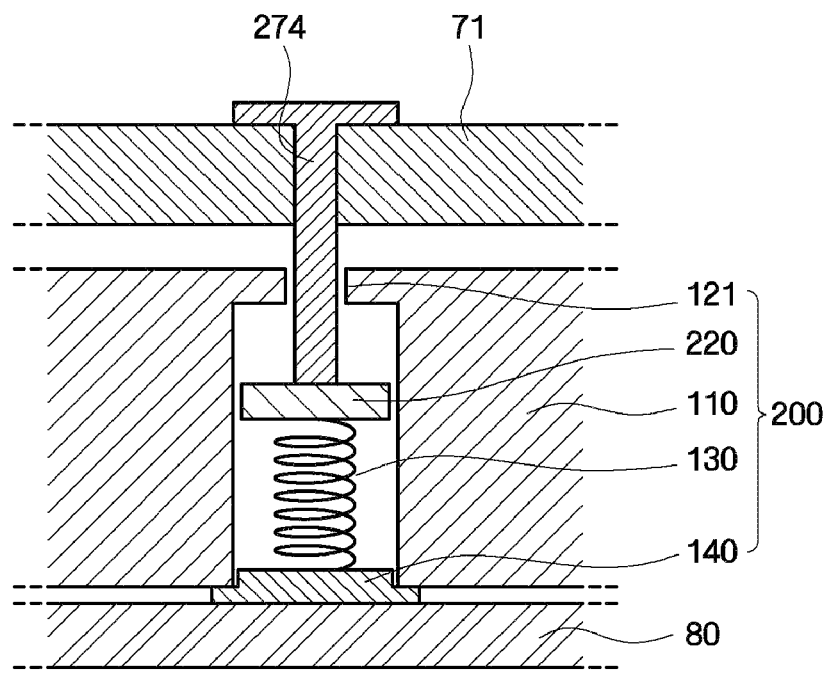

Hereinafter, an alternative exemplary embodiment of a backlight assembly according to the present invention will be described in further detail with reference to FIGS. 8 to 10B. FIG. 8 is a partial cross-sectional view of an alternative exemplary embodiment of a backlight assembly according to the present invention, and FIG. 9 is a partial perspective view of an exemplary embodiment of a first substrate included in the backlight assembly shown in FIG. 8. FIGS. 10A and 10B are partial cross-sectional views illustrating a method of engaging an exemplary embodiment of a first substrate with an exemplary embodiment of a second substrate of the backlight assembly shown in FIG. 8. In FIGS. 8 to 10B, the same reference characters are used for the same or like elements as whose described in greater detail above with reference to exemplary embodiments shown in FIGS. 1 to 7, and any repetitive detailed description thereof will hereinafter be omitted.

In a backlight assembly 10 according to an alternative exemplary embodiment, first electrodes 274 are disposed to project to a lower part of the first substrate 71, and one end part of each of the first electrodes 274 is in contact with a second electrode 220 disposed inside a cylinder 160 through a hole 121 of a connector 200.

The connector 200 according to an alternative exemplary embodiment includes a body part 110, cylinders 160, second electrodes 220, elastic members 130, connection electrodes 140 and fixing projections 150. The body part 110 includes an insulating material, and further includes a plurality of the cylinders 160 disposed therein. The cylinders 160 may be disposed in a substantially matrix pattern on the body part 110. The second electrodes 220 are inserted into, e.g., are disposed in, the cylinders 160.

The second electrodes 220 are in contact with the first electrodes 274 of the first substrate 71 to apply a voltage thereto, and the second electrodes 220 disposed in the connector 100 apply the voltage to corresponding light source units 72. Since the second electrodes 220 are disposed in the substantially matrix pattern in the connector 200, they are arranged in a narrow, e.g., substantially reduced space.

A hole 121 is formed in the connector 200 on one side of each cylinder 160. Specifically, the hole 121 is formed between the cylinder 160 and the first electrode 274 on the body part 110.

The second electrode 220 is positioned inside the cylinder 160, and a diameter of the second electrode 220 is greater than a diameter of the hole 121. Accordingly, the second electrode 220 does not project through the hole 121, but is instead disposed only inside the cylinder 160.

The second electrode 220 is disposed to be in contact with the elastic member 130. The elastic member 130 provides a force, e.g., an elastic force, to the second electrode 220 to increase a contact force between the first electrode 274 and the second electrode 220.

Referring to FIGS. 8 and 9, the first electrode 274 may be disposed to project through the lower surface of the first substrate 71. The first electrode 274 may be formed to penetrate the first substrate 71, or may be attached to a lower surface of the first substrate 71 without penetrating the first substrate 71.

The first electrode 274 has a first end part in contact with the wire pattern 73, and a second end part in contact with the second electrode 220 through the hole 121 of the connector 200. The first electrodes 274 may be disposed in a substantially matrix pattern on the first substrate 71.

Hereinafter, a method of engaging the first substrate 71 with the second substrate 80 will be described in further detail with reference to FIGS. 10A and 10B. FIGS. 10A and 10B are partial cross-sectional views illustrating a method of engaging of the first substrate 71 with the second substrate 80 of the backlight assembly shown in FIG. 8.

First, referring to FIG. 10A, the connector 200 is mounted on the second substrate 80, but the second substrate 80 is not electrically connected to the first substrate 71. Thus, the second electrode 220 is disposed apart from the first electrode 274, and the elastic member 130 is extended to push the second electrode 220 upward.

The first electrode 274 projects to the lower part of the first substrate 71, and is positioned on the outside of the connector 200.

Then, referring to FIG. 10B, a gap between the first substrate 71 and the second substrate 80 is narrowed, and the first electrode 274 and the second electrode 220 contact each other. Accordingly, one end part of the first electrode 274 is inserted into the hole 121 of the connector 200.

One end part of the first electrode 274 inserted into the hole 121 of the connector 200 and contacts the second electrode 220 to push the second electrode 220 downward (as viewed in FIG. 10B). In this case, the elastic member 130 disposed on the lower part of the second electrode 220 is compressed, as shown in FIG. 10B. As described in greater detail above with respect to FIGS. 1 to 7, the contact force of the first electrode 274 and the second electrode 220 is substantially proved by the elastic force of the elastic member 130.

Since one end part of the first electrode 274 is inserted into, e.g., is disposed in, the hole 121 of the connector 200, the first electrode 274 and the connector 200 are effectively prevented from crossing each other in a horizontal direction (as viewed in FIG. 10B). Put another way, by making the outside diameter of the first electrode 274 and the inside diameter of the hole 121 substantially the same, the first electrode 274 and the connector 200 are effectively prevented from moving in the horizontal direction.

In addition, the first electrode 274 and the second electrode 220 are in contact with each other in the cylinder 160, which includes an insulating material, and thus, even if a spark is generated between the first electrode 274 and the second electrode 220, the spark does not affect adjacent electrodes. However, as described above according to the first embodiment of the present invention, the first electrode 274 and the second electrode 220 are always in contact with each other by the elastic member 130, and thus a probability that the spark will generated between the first electrode 274 and the second electrode 220 is substantially reduced in an exemplary embodiment.

Figure 11:
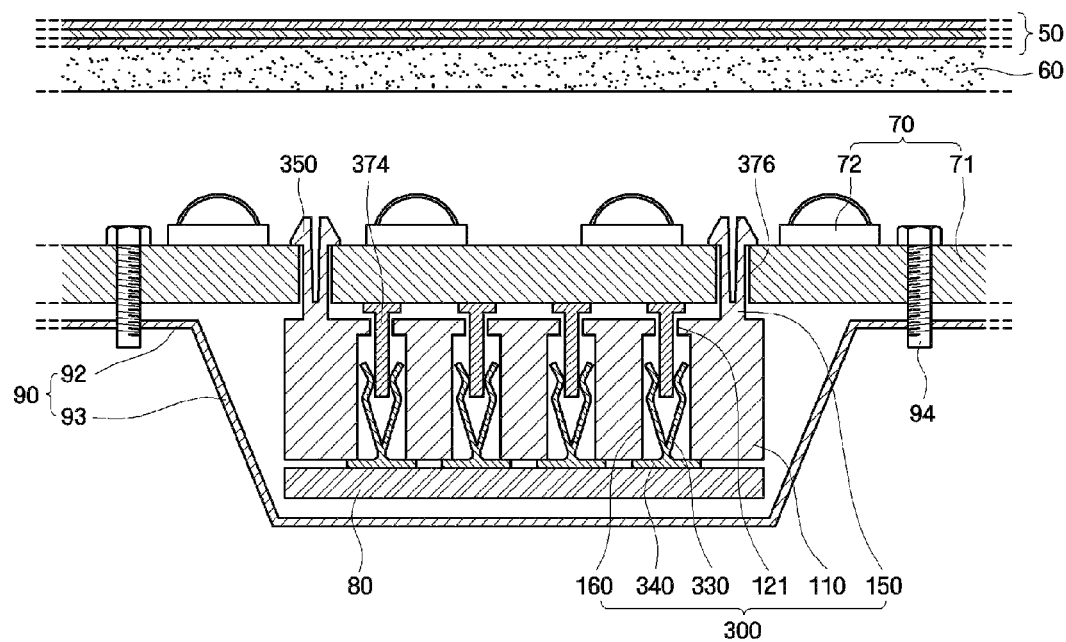
FIG. 11 is a partial cross-sectional view of another alternative exemplary embodiment of a backlight assembly according to the present invention.
Figure 12A:
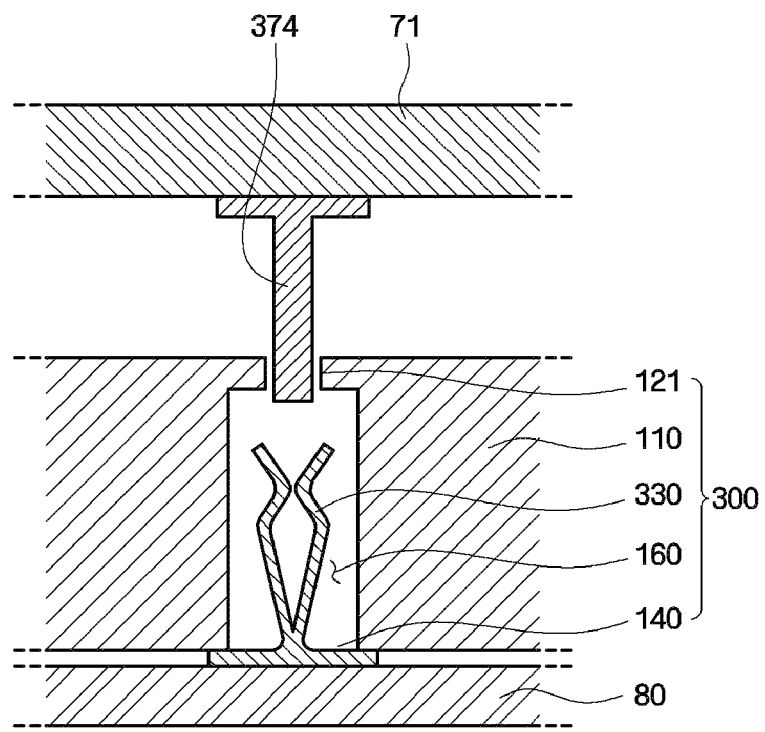
FIGS. 12A and 12B are partial cross-sectional views illustrating a method of engaging an exemplary embodiment of a first substrate with an exemplary embodiment of a second substrate of the backlight assembly shown in FIG. 11.
Figure 12B:
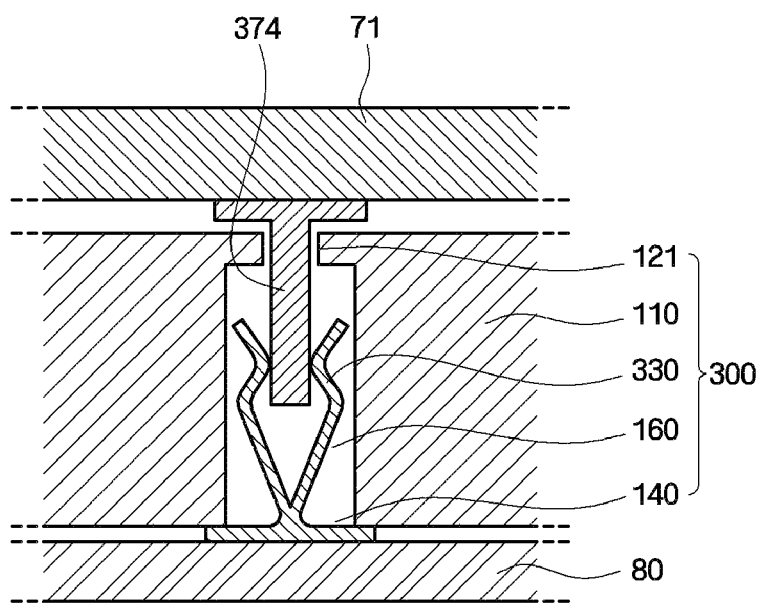

Hereinafter, another alternative exemplary embodiment of a backlight assembly according to the present invention will be described in further detail with reference to FIGS. 11 to 12B. FIG. 11 is a partial cross-sectional view of another alternative exemplary embodiment of a backlight assembly according to the present invention, and FIGS. 12A and 10B are partial cross-sectional views illustrating a method of engaging an exemplary embodiment of a first substrate with an exemplary embodiment of a second substrate of the backlight assembly shown FIG. 11. In FIGS. 11 to 12B, the same reference characters are used for the same or like elements as those described in greater detail above with reference to exemplary embodiments shown in FIGS. 1 to 10, and any repetitive detailed description thereof will hereinafter be omitted.

In a backlight assembly 10 according to an exemplary embodiment, first electrodes 374 are disposed to project toward the lower part of the first substrate 71, and one end part of each of the first electrodes 374 contacts a second electrode 330 inside a cylinder 160 through a hole 121 of a connector 300. In this case, the second electrode 330 may be disposed to contact at least two sides, e.g., the left and right sides of the lower portion of the first electrode 374, as shown in FIG. 11.

Referring to FIG. 11, the connector 300 according to an exemplary embodiment includes a body part 110, cylinders 160, second electrodes 330, connection electrodes 340 and fixing projections 350. The body part 110 includes an insulating material, and further includes a plurality of the cylinders 160 substantially therein. The cylinders 160 may be disposed in a substantially matrix pattern on the body part 110. The second electrodes 330 are inserted into, e.g., are disposed in, corresponding cylinders 160 of the plurality of cylinders 160.

The second electrodes 330 contact the first electrodes 374 of the first substrate 71 to apply a voltage thereto. The second electrode 330 has a shape similar to tweezers, and thus presses both sides of the first electrode 374. The second electrode 330 is connected to the connection electrode 340, and has a predetermined elasticity to effectively maintain a contact force with the first electrode 374.

In the cylinder 160, a separate elastic member (not shown) for reinforcing the elastic force of the second electrode 330 may be provided. The second electrode 330 illustrated in the exemplary embodiment shown in FIG. 11 has elasticity so that it serves as an elastic member as well as an electrode, but alternative exemplary embodiments are not limited thereto.

In an exemplary embodiment, the connector 300 may be hook-engaged with the first substrate 71. Specifically, the first substrate 71 includes fixing holes 376, and the connector 300 includes fixing projections 350 in the form of a hook, as shown in FIG. 11. In this case, the fixing holes 376 penetrate the first substrate 71, and the fixing projections 350 are inserted into the fixing holes 376 to penetrate the first substrate 71. The fixing projections 350 effectively prevent the first electrode 374 from seceding from, e.g., from being pulled out of, the connector 300.

Hereinafter, a method of engaging the first substrate 71 with the second substrate 80 will be described in further detail with reference to FIGS. 12A and 12B.

First, referring to FIG. 12A, the connector 300 is disposed on the second substrate 80, and the second substrate 80 is not electrically connected to the first substrate 71 at this point. Specifically, the second electrode 330 is apart from the first electrode 374.

The first electrode 374 projects toward the lower part of the first substrate 71, and is positioned outside of the connector 300.

Then, referring to FIG. 12B, a gap between the first substrate 71 and the second substrate 80 is narrowed, and the first electrode 374 is thereby positioned between the second electrode 330. More specifically, one end part of the first electrode 374 is inserted into the hole 121 of the connector 300.

The one end part of the first electrode 374 inserted into the hole 121 of the connector 300 contacts the second electrode 330 to open the second electrode 330. In this case, the first electrode 374 is disposed between open parts of the second electrode 330, and the second electrode 330 elastically presses against two sides the first electrode 374.

In an exemplary embodiment, the first electrode 374 and the second electrode 330 are in contact with each other in the cylinder 160 formed of an insulating material, and thus, even if a spark is generated between the first electrode 374 and the second electrode 330, the spark does not affect neighboring electrodes.

However, in an exemplary embodiment, even if the first electrode 374 is moved between the open parts of the second electrode 330, contact between the first electrode 374 and the second electrode 330 is maintained. Moreover, the contact between the first electrode 374 and the second electrode 330 can be maintained unless the first electrode 374 completely secedes from the second electrode 330. Accordingly the spark is effectively prevented from being generated.

Hereinafter, an exemplary embodiment of a display device according to the present invention will be described in further detail with reference to FIG. 13. FIG. 13 is an exploded perspective view of a display device according to an exemplary embodiment.

A display device 1 according to an exemplary embodiment includes a display panel 30, an upper receptacle 20 and a backlight assembly 10.

The display panel 30 includes a lower substrate 31 having gate lines (not shown), data lines (not shown), a thin film transistor array, pixel electrodes and an upper substrate 32 having black matrices, common electrodes, for example, and disposed opposite the lower substrate. The display panel receives light from the backlight assembly 10 to display an image thereon.

An upper receptacle 20 forms an external periphery of the display device 1, and a space for accommodating the display panel 30 is formed therein. In a center part of the upper receptacle 20, an open window exposing the display panel 30 to outside is formed.

The upper receptacle 20 is engaged with a lower receptacle 90. Between the upper receptacle 20 and the lower receptacle 90, an optical sheet 50, a diffusion plate 60 and a light source assembly 70 are accommodated.

Moreover, an intermediate frame 40 for seating the display panel 30 thereon is disposed between the upper receptacle 20 and the lower receptacle 90.

The backlight assembly 10 according to an exemplary embodiment is disposed on a lower part of the display panel 30, as shown in FIG. 13, and provides the light to the display panel 30. The backlight assembly 10 includes the light source assembly 70, the optical sheet 50, the diffusion plate 60 and the lower receptacle 90.

Thus, according to exemplary embodiments of the present invention as described herein, a backlight assembly includes a structure in which a circuit board, having light sources mounted thereon, and a circuit board, having a power supply part mounted thereon to supply power to the light sources, are freely arranged and easily connected to each other.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the scope or spirit of the present invention as defined by the following claims.

What is claimed is:

1. A backlight assembly comprising:
a first substrate;
a first electrode extending from a first major surface plane defining the first substrate;
a second substrate defined by a second major surface plane disposed opposite to the first major surface plane defining the first substrate; and
a connector disposed on the second substrate and intermediate the first and second major surface planes, the connector comprising:
a second electrode connected to the first electrode; and
an elastic member which applies a force to the second electrode,
wherein the connector increases a contact force between the first electrode and the second electrode by applying the force to the second electrode.

2. The backlight assembly of claim 1, wherein the elastic member comprises a conductive elastic material.

3. The backlight assembly of claim 1, wherein the connector further comprises:
a cylinder accommodating the second electrode and the elastic member therein; and
a hole formed in the connector between the cylinder and the first electrode,
wherein one of the first electrode and the second electrode is disposed in the hole.

4. The backlight assembly of claim 3, wherein a diameter of the hole is less than a diameter of the cylinder.

5. The backlight assembly of claim 4, wherein
a diameter of a first end part of the second electrode which is disposed in the hole and contacts the first electrode is less than the diameter of the hole,
a diameter of a second end part of the second electrode, opposite the first end part thereof, is greater than the diameter of the hole, and
the second end part of the second electrode contacts the elastic member.

6. The backlight assembly of claim 4, wherein
a diameter of the second electrode is greater than the diameter of the hole, and
an end part of the first electrode is disposed in the hole and contacts the second electrode.

7. The backlight assembly of claim 1, wherein
the connector comprises a body part, and
the second electrode and the elastic member are disposed in the body part.

8. The backlight assembly of claim 7, wherein
the first electrode extends from the first substrate toward the second substrate, and
the second electrode contacts at least two sides of the first electrode.

9. The backlight assembly of claim 1, wherein the first electrode contacts only one surface of the first substrate.

10. The backlight assembly of claim 1, wherein the connector is disposed on the second substrate by surface mount technology.

11. The backlight assembly of claim 1, wherein
the first substrate comprises a fixing hole, and
the connector further comprises a fixing projection disposed in the fixing hole.

12. The backlight assembly of claim 11, wherein
the fixing hole is formed in the first substrate, and
the fixing projection is hook-engaged with the fixing hole.

13. The backlight assembly of claim 1, further comprising:
a light source disposed on the first substrate; and a power supply part disposed on the second substrate and configured to supply power to the light source.

14. The backlight assembly of claim 1, further comprising a receptacle which accommodates the first substrate, the connector and the second substrate therein, wherein the receptacle comprises:
a bottom part disposed adjacent to the first substrate; and
an embayment part extending from the bottom part to accommodate the connector and the second substrate therein.

15. The backlight assembly of claim 14, wherein a shape of the embayment part on the bottom part of the receptacle is defined by peripheries of two rectangles having equal first lengths and disposed apart from each other and longitudinally aligned parallel to each other along a first direction, connected by two additional rectangles having equal second lengths, shorter than the first lengths, and disposed apart from each other and longitudinally aligned parallel to each other along a second direction substantially perpendicular to the first direction.

16. The backlight assembly of claim 1, further comprising fixing members which fix the first substrate to the receptacle.

17. A display device comprising:
a display panel which displays an image;
a first substrate disposed on a lower portion of the display panel;
a first electrode extending from a first major surface plane defining the first substrate;
a second substrate defined by a second major surface plane disposed opposite to the first major surface plane defining the first substrate;
a connector disposed on the second substrate and intermediate the first and second major surface planes, the connector comprising:
a second electrode connected to the first electrode; and
an elastic member which applies a force to the second electrode; and
a receptacle which receives the first substrate, the connector and the second substrate therein,
wherein the connector increases a contact force between the first electrode and the second electrode by applying the force to the second electrode.

18. The display device of claim 17, wherein the connector further comprises:
a cylinders accommodating the second electrode and the elastic member therein; and
a hole formed in the connector between the cylinder and the first electrode, wherein one of the first electrode and the second electrodes is disposed in the hole.

19. The display device of claim 17, further comprising:
a light source disposed on the first substrate; and
a power supply part disposed on the second substrate and configured to supply power to the light source.

20. The display device of claim 17, wherein the receptacle includes a bottom part adjacent to the first substrate, and an embayment part embayed from the bottom part to accommodate the connector and the second substrate therein.

* * * * *